(12) United States Patent
Tsugita

(10) Patent No.: US 6,195,175 B1
(45) Date of Patent: Feb. 27, 2001

(54) METHOD AND APPARATUS FOR COLOR CORRECTION

(75) Inventor: Makoto Tsugita, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/124,679

(22) Filed: Jul. 30, 1998

(30) Foreign Application Priority Data

Aug. 15, 1997 (JP) .................................................. 9-220385

(51) Int. Cl.$^7$ ............................. G06K 15/02; H04N 1/62
(52) U.S. Cl. ..................... 358/1.9; 358/518; 358/537; 358/503; 358/504; 358/1.1; 358/1.2
(58) Field of Search ................ 358/1.1, 1.2, 1.9, 358/503, 504, 512, 520, 522, 532, 535, 537, 517, 518

(56) References Cited

U.S. PATENT DOCUMENTS

| | | | |
|---|---|---|---|
| 4,786,939 | * | 11/1988 | Haneda ..................................... 355/4 |
| 5,380,610 | * | 1/1995 | Haneda et al. .......................... 430/31 |
| 5,582,941 | * | 12/1996 | Kato et al. ............................... 430/47 |
| 5,689,785 | * | 11/1997 | Kato et al. ............................. 399/302 |

* cited by examiner

*Primary Examiner*—Jerome Grant, II
*Assistant Examiner*—Kevin Kianni
(74) *Attorney, Agent, or Firm*—Sughrue, Mion, Zinn, Macpeak & Seas, PLLC

(57) ABSTRACT

The present invention aims to provide satisfactory color reproduction without causing color mixing when a color image is formed on a direct heat-sensitive color recording medium. To input values of R, G and B, matrix calculation is performed to intensify chroma. To the output at a matrix calculation unit 10, contrast is decreased with respect to a predetermined color component of a predetermined color, and selective color correction processing is performed to exclude color mixing. Then, colors are converted to Y, M and C respectively. As a result, when an image of M color is formed or when an image of M component is formed during the formation of an image in red color, higher contrast is obtained compared with the case where an image in gray color is formed until the value of M reaches a certain value, and density of said color is made lower than the density during the formation of the image in gray color when the signal value exceeds said value, and color mixing does not occur. The same applies to the case where an image in Y component only is formed and when an image in Y component is formed during the formation of an image in green color.

4 Claims, 7 Drawing Sheets

METHOD AND APPARATUS FOR COLOR CORRECTION

BACKGROUND OF THE INVENTION

The present invention relates to a method and an apparatus for color correction when a color image is formed, and in particular to a method and an apparatus for color correction suitable for application on a color printer, which is used to form color image on a direct heat-sensitive color recording medium where cyan heat-sensitive color developing layer, a magenta heat-sensitive color developing layer, and a yellow heat-sensitive color developing layer are sequentially deposited on each other.

The present applicant previously proposed a direct heat-sensitive color recording medium as shown in FIG. 7. This medium can be briefly described as follows: In FIG. 7, on a paper base 1, a cyan heat-sensitive color developing layer 2, a magenta heat-sensitive color developing layer 3, and a yellow heat-sensitive color developing layer 4 are deposited sequentially on each other, and a heat-resistant protective layer 5 is provided on the uppermost layer. In the following, cyan is abbreviated as "C" magenta as "M", and yellow as "Y".

The C heat-sensitive color developing layer 2 comprises a micro-capsule enveloping a diazonium chloride compound having high reaction activity and a C coupler. The M heat-sensitive color developing layer 3 comprises a micro-capsule enveloping a diazonium chloride compound with high reaction activity and an M coupler. The Y heat-sensitive color developing layer 4 comprises a micro-capsule enveloping a diazonium chloride compound having high reaction activity and a Y coupler.

Each of the C heat-sensitive color developing layer 2, the A heat-sensitive color developing layer 3, and the Y heat-sensitive color developing layer 4 has heat-sensitive property shown in FIG. 9, and optical density, i.e. coloring density, is determined according to the value of the heat energy given.

Next, description will be given on a method to form a color image on a direct heat-sensitive color recording medium referring to FIG. 8. In FIG. 8, the protective layer 5 is not illustrated.

As shown in FIG. 8(a), color is developed by the Y coupler in the Y heat-sensitive color developing layer by heating with low energy using a thermal head 6. Next, as shown in FIG. 8(b), ultraviolet ray with a first wavelength is emitted from a lamp 7. Thus, on diazo compound not yet developing color in the Y heat-sensitive color developing layer 4, photo dissociation is performed, and it is fixed. As a result, the Y coupler will not develop color any more even when it may be heated. An image of Y component is thus formed.

Next, an image of M component is formed. In this case, also, as shown in FIG. 8(c), color is developed by the H coupler in the M heat-sensitive color developing layer 3 by heating with moderate energy using the thermal head 6. Then, as shown in FIG. 8(d), ultraviolet ray with a second wavelength is emitted from the lamp 7, and on diazo compound not yet developing color in the M heat-sensitive color developing layer 3, photodissociation is performed, and it is fixed. As a result, the M coupler will not develop color any more even when it may be heated.

Next, an image of C component is formed. In this case, as shown in FIG. 8(e), color is developed by the C coupler in the C heat-sensitive color developing layer 2 by heating with high energy using the thermal head 6. For the C color, fixation may be carried out using ultraviolet ray of a predetermined wavelength, while it is known that there is practically no problem even when fixation is not performed.

By the process described above, an image can be formed in full color.

However, when an image is formed in full color on a direct heat-sensitive color recording medium as described above, color mixing may occur. Specifically, as it is evident from FIG. 9, when heating is performed with energy in the range of $E_1-E_2$, color develops not only by Y but also by M. When an image is to be formed with Y component only and the Y coupler is heated with energy of $E_1-E_2$ to develop color in high density, not only Y but also M is developed a little, and color mixing occurs. Similarly, when it is heated with energy of $E_3-E_4$ in FIG. 9, not only M but also C is developed a little. When it is wanted to form an image of M component only and it is tried to develop M in high color density, not only M but also C is developed a little when heating with energy of $E_3-E_4$, and color mixing occurs.

The color mixing as described above also occurs in the cases given below in addition to the above two cases: One is the case where it is wanted to form a red image including M in high density and it is heated with energy of $E_3-E_4$ in FIG. 9 when the image of M component is formed. In this case, C is also developed a little and color mixing occurs, and the reproducibility of the developed red color may not be satisfactory.

The other is the case where it is wanted to form a green image including Y in high density and it is heated with energy of $E_1-E_2$ of FIG. 9 when the image of Y component is formed. In this case, M is also developed a little and color mixing occurs, and the reproducibility of the obtained green color may not be satisfactory.

No problem of color mixing occurs in the case other than the above. For example, in case an image in black color in high density is formed, even when M is developed during the formation of an image of Y component, there is no problem because M is then developed in high density during the formation of the image of M component. Even when C is developed during the formation of the image of M component, there is no problem because C is developed in high density when the image of C component is formed.

In case a red image is formed, the image of Y component is formed at first. In this case, even when M is developed, no problem of color mixing occurs because M is developed in the process to form the image of M component.

Further, the problem of color mixing does not occur in case a blue image including M in high density is formed. In this case, the image of M component is formed by heating with energy of $E_3-E_4$ of FIG. 9. In this case, even when C is developed, the problem of color mixing does not occur because C is developed in the next process to form the image of C component.

Additional description is given now for reference. As it is evident from the description on the process to form color image in the above, the image of M component is formed always after fixation of Y color. For example, in case an image of M component is formed during the formation of an image of M component only, fixation of Y color is carried out prior to the formation of the image of M component. Even when it is heated with energy of $E_1-E_2$ of FIG. 9 during the formation of the image of M component, Y is not developed. Similarly, during the formation of the image of C component only, Y color and M color are already fixed. Then, even when it is heated with energy of $E_3-E_4$ in FIG. 9 during the formation of the image of C component, M is not developed.

Accordingly, when an image in full color is formed on a direct heat-sensitive color recording medium, the problem of color mixing arises in the following four cases:

(1) When an image of Y component only is formed and Y is developed in high density.
(2) When an image of M component only is formed and M is developed in high density.
(3) When an image in red color is formed and M is developed in high density.
(4) When an image in green color is formed and Y is developed in high density.

In the meantime, various types of color processing are performed on a color printer, and color mixing as described above may occur due to the technique of color processing. For example, chroma intensifying processing is sometimes performed by matrix calculation using a matrix of 3×3 to signals of R, G and B as given in the following equation:

$$\begin{pmatrix} R' \\ G' \\ B' \end{pmatrix} = \begin{pmatrix} 1.2 & -0.1 & -0.1 \\ -0.1 & 1.2 & -0.1 \\ -0.1 & -0.1 & 1.2 \end{pmatrix} \begin{pmatrix} R \\ G \\ B \end{pmatrix} \quad (1)$$

In the equation (1), matrix calculation is performed to the signals of R, G and B, but it is needless to say that it can also be carried out to the signal of Y, M and C.

When the matrix calculation is performed as described above, characteristics as shown in FIG. 10 can be obtained. FIG. 10 is a diagram to show the "signal value to density" characteristics in M. In this figure, the characteristics given by A are the characteristics of M when an image of M component only is formed and when an image of M component is formed during the formation of a red image. The characteristics shown by b represents the characteristics of M when an image of M component is formed during the formation of a gray image. Naturally, similar characteristics are described for Y and C.

Specifically, when a gray image is formed, the characteristics of M are the one shown by b in FIG. 10. When, an image of M only and a red image are formed, the density of M is higher than the density during the formation of the gray image as shown by a in FIG. 10, i.e. high contrast. Thus, chroma is intensified.

The chroma intensifying processing as described above is generally effective. When such chroma intensifying processing is performed during the formation of image on the direct heat-sensitive color recording medium, heating with high energy is carried out even to M which has moderate signal value. As a result, color mixing as described above may be more likely to occur.

To avoid the color mixing as described above, a method may be used, in which Y and M are not used in high density. That is, in case Y is developed, it is heated with energy lower than $E_1$ in FIG. 9. In case M is developed, it is heated with energy lower than $E_3$ in FIG. 9. It is evident that the problem of color mixing does not occur if Y and M are not used in high density.

However, if Y and M in higher density are not used, it is impossible to obtain pure color when M is mixed with C although M may be mixed with Y. Black color in high density cannot be developed.

SUMMARY OF THE INVENTION

To solve the above problems, it is an object of the present invention to provide a method and an apparatus for color correction, by which it is possible to cause no color mixing in case an image in full color is formed on a direct heat-sensitive color recording medium and to reproduce satisfactory color.

To attain the above object, a method for color correction according to claim 1 of the present invention is characterized in that, in forming a color image on a predetermined recording medium, when an image of a predetermined color component is formed in an image of a predetermined color, higher contrast is obtained than the case of the formation of a gray image until the value of the color component reaches a certain value, and the density of the color is made lower than the density during the formation of a gray image when the signal value is more than the above value.

The method for color correction according to claim 2 of the present invention is characterized in that, in forming a color image on a direct heat-sensitive color recording medium, which contains a cyan heat-sensitive color developing layer, a magenta heat-sensitive color developing layer, and a yellow heat-sensitive color developing layer deposited sequentially on each other, when an image of a predetermined color component is formed in an image of a predetermined color, higher contrast is obtained than the case of the formation of a gray image until signal value of the color component reaches a certain value, and the density of the color is made lower than the density during the formation of the gray image when the signal value is lower than the above level.

Here, the method for color correction according to claim 3 of the present invention is characterized in that an image of a predetermined color component in an image of the predetermined color is a magenta component image in an image in magenta color, a magenta component image in an image in red color, a yellow component image in an image of yellow color, and a yellow component image in an image of green color.

The method for color correction according to claim 4 of the present invention is characterized in that characteristics to intensify chroma is obtained in the cases other than the above cases.

Further, the method for color correction according to claim 5 of the present invention is characterized in that matrix calculation is carried out to perform chroma intensifying to an input signal, and to the result of the matrix calculation, contrast is decreased to a predetermined color component of a predetermined color, and selective color correction processing to exclude color mixing is performed.

Further, an apparatus for color correction according to claim 6 of the present invention comprises means for performing matrix calculation to carry out chroma intensifying to an input signal, and means for decreasing contrast to a predetermined color component of a predetermined color to an output signal of the matrix calculation means and for performing selective color correction processing to exclude color mixing.

DETAILED DESCRIPTION OF THE PREFERRED EMBODIMENT

In the following, description will be given on an embodiment of the present invention referring to the attached drawings.

To avoid color mixing as described above, high density region should not be used only in the four cases of (1) to (4) as given above. That is, the use of the high density region should be selectively avoided depending upon the color during the formation of the image.

Figure 1:
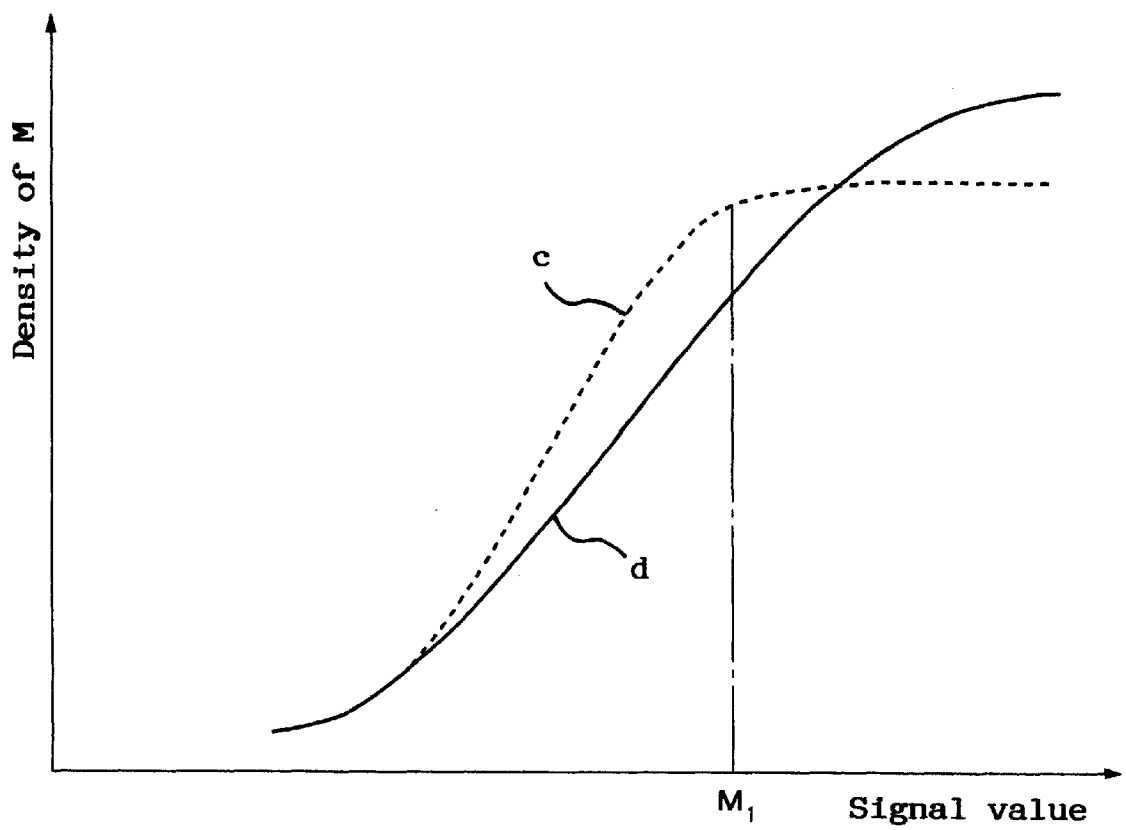
FIG. 1 is a diagram of "signal value to density" characteristics of M achieved according to the present invention where the characteristics shown by c represents the characteristics when an image of M color is formed and when M component is formed during the formation of an image in red color, and the characteristics shown by d represents the characteristics when M component is formed during the formation of an image in gray color.

More concretely, when an image of M component is formed and when an image in M color is formed during the formation of an image in red color, the characteristics should be as shown by c in FIG. 1 with respect to M. FIG. 1 is a diagram to show "signal value to density" characteristics of M according to the present invention. In the figure, the characteristics shown by c represents the characteristics when an image in M color is formed and when M component is formed during the formation of an image in red color. The characteristics shown by d represents the characteristics when M component is formed during the formation of an image in gray color.

In FIG. 1, the characteristics shown by c has higher contrast compared with the case where the image in gray color is formed until signal value of M reaches $M_1$, while density of M is lower than the density of M during the formation of the image in gray color when the signal value exceeds $M_1$. Here, it is supposed that the density of M when the signal value exceeds $M_1$ is a density, which can be developed by heating with energy of less than $E_3$ in FIG. 9.

Figure 9:
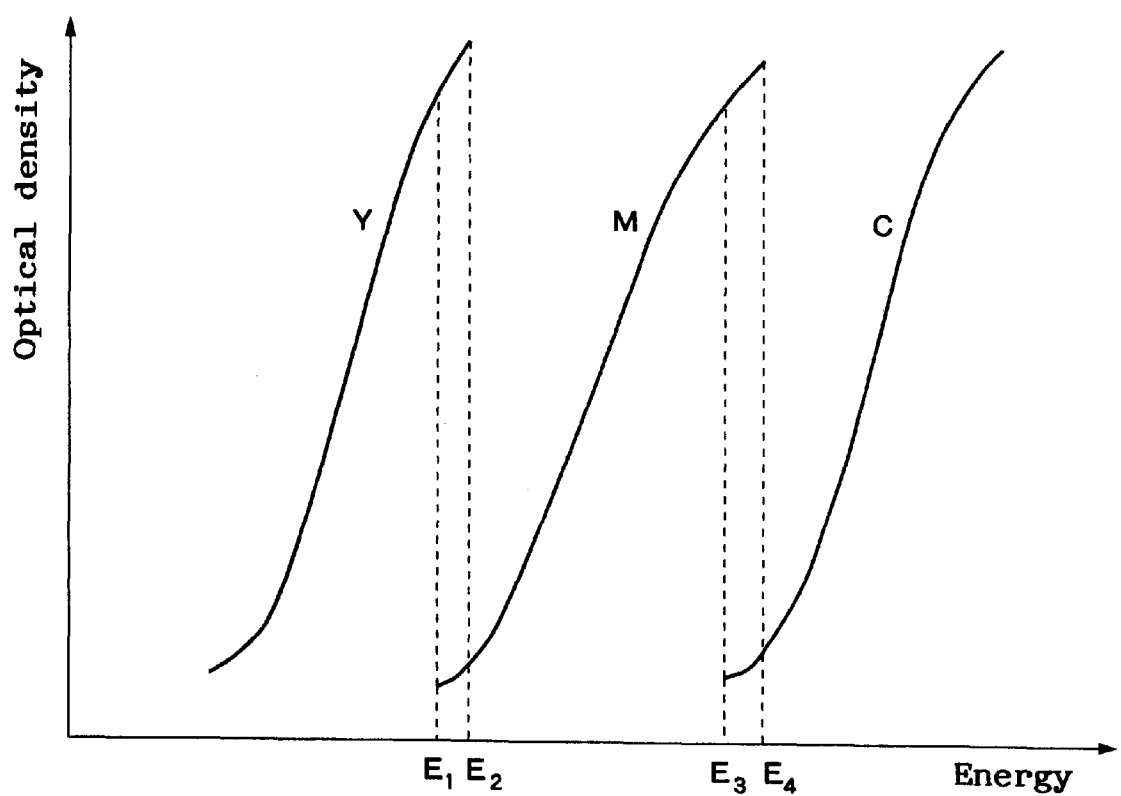
FIG. 9 is a diagram to show heat-sensitive characteristics of a C heat-sensitive color developing layer, an M heat-sensitive color developing layer, and a Y heat-sensitive color developing layer of the direct heat-sensitive color recording medium of FIG. 7.

According to the characteristics, when the image in M color is formed and when the image in red color is formed, M color can be developed without heating with energy of $E_3$ or more in FIG. 9, and it is possible to avoid color mixing.

Figure 2:
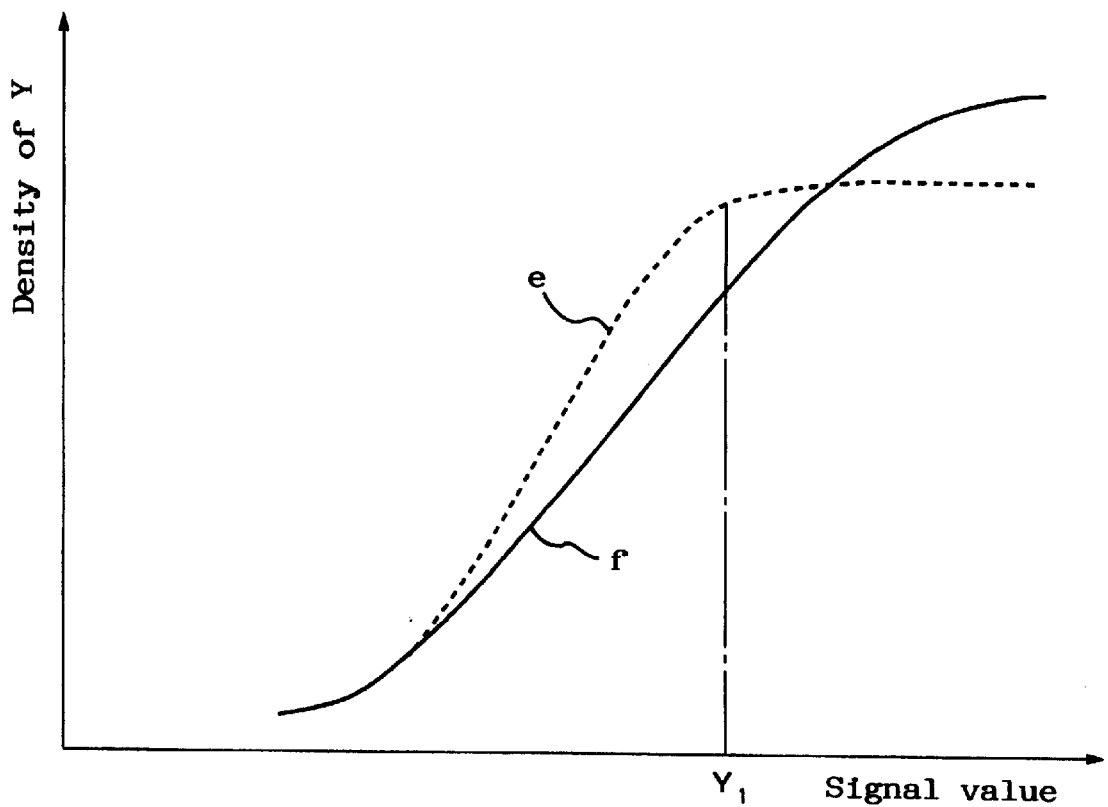
FIG. 2 is a diagram to show "signal value to density" characteristics of Y achieved according to the present invention where the characteristics shown by e represents the characteristics when an image in Y color is formed and when Y component is formed during the formation of an image in green color, and the characteristics shown by f represents the characteristics when Y component is formed during the formation of an image in gray color.

Similarly, when an image in Y color is formed and when an image of Y component is formed during the formation of an image in green color, the characteristics shown by e in FIG. 2 is used for Y. FIG. 2 is a diagram to show "signal value to density" characteristics of Y according to the present invention. In the figure, the characteristics shown by e represents the characteristics when an image in Y color is formed and when Y component is formed during the formation of an image in green color, and the characteristics shown by f represents the characteristics when Y component is formed during the formation of an image in gray color.

In FIG. 2, the characteristics shown by e has higher contrast compared with the case where the image in gray color is formed until the signal value of Y reaches $Y_1$, while density of Y is lower than the density of Y during the formation of the image in gray color when the signal value exceeds $Y_1$. Here, it is supposed that the density of Y when the signal value exceeds $Y_1$ is a density, which can be developed with energy of less than $E_1$ in FIG. 9.

According to such characteristics, during the formation of the image in Y color and the image in green color, Y color can be developed without heating with energy of $E_1$ or more in FIG. 9, and it is possible to avoid color mixing.

Figure 10:
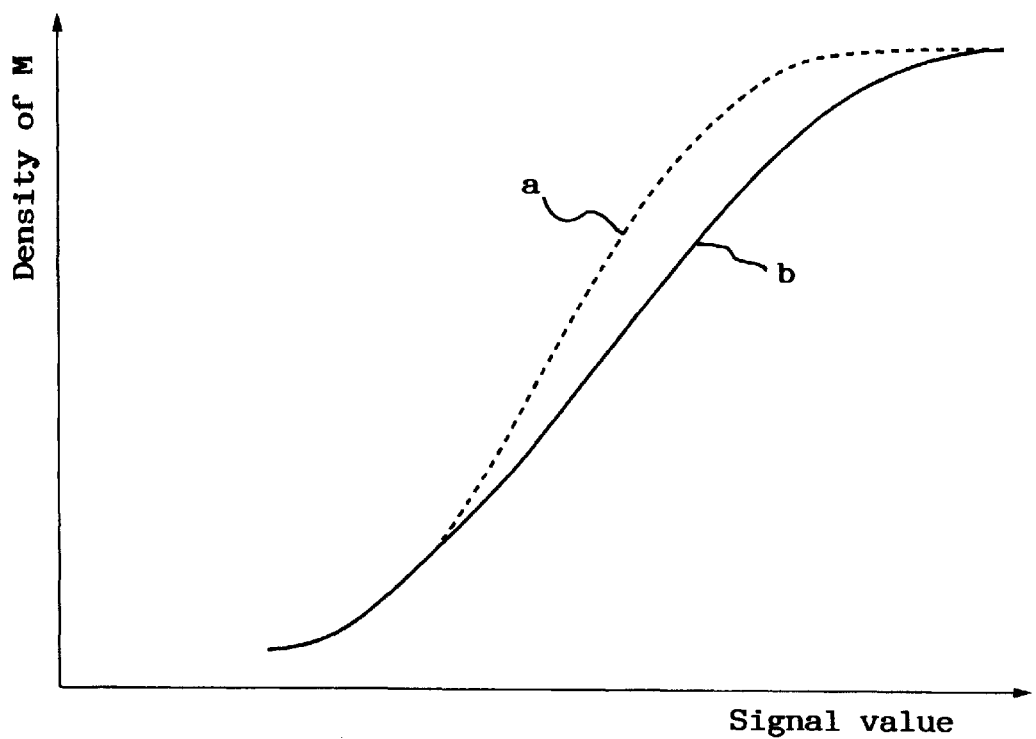
FIG. 10 is a diagram to show the characteristics obtained by a matrix calculation unit 10 of FIG. 4.

For the cases other than the above, the characteristics with intensified chroma as shown by a in FIG. 10 may be used. Because color mixing does not occur except the four cases of (1) to (4) given above, it is evident that no problem of color mixing occurs even when chroma intensifying processing is performed except the above four cases.

Figure 3:
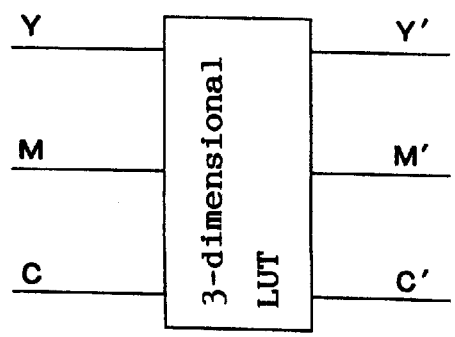
FIG. 3 is a drawing of an example to obtain an output color signal with the desired characteristics to a predetermined input color signal, and it is used to explain a method using 3-dimensional LUT.

Next, consideration is given to a method to achieve the above characteristics. One of the methods to obtain output color signal with the desired characteristics to a predetermined input signal is a method to use 3-dimensional LUT as shown in FIG. 3. It is supposed that the input signals are Y, M and C, and that output signal values of Y', M' and C' to all combinations of the input signals of Y, M and C are written to 3-dimensional LUT. Then, using the 3-dimensional LUT, it is possible to obtain any desired input/output characteristics. If it is supposed that each of the input values of Y, M and C is 8 bits, and each of the output values of Y', M' and C' is 8 bits, enormous memory capacity is required in the 3-dimensional LUT, and this means high cost and it is not very practical at present.

Next, as a method to decrease memory capacity, there is the so-called 8-point interpolation method. According to this method, color space of each of the input signals of Y, M and C is divided to a cube of n×n×n. Only to the color at the vertex of each of these cubes, output signal values Y', M' and C' are determined. To a combination of the input color signal at a position other than the vertex of each of these cubes, interpolation is performed according to output signal values determined at 8 points of the cube enclosing this position, and an output signal value is obtained. By this method, memory capacity can he decreased compared with the method using 3-dimensional LUT as described above, while interpolation calculation requires troublesome procedure and much time, and this is not very desirable for a color printer, which is widely used by general users.

In this respect, the present inventor has developed a new method to calculate the desired input/output characteristics within short time. Description will be given now on this method referring to an apparatus for color correction shown in FIG. 4. Here, it is supposed that input signals are R, G and B, and that signals of Y, M and C to be ultimately supplied to thermal head are obtained through calculation.

A matrix arithmetic unit 10 performs 3×3 matrix calculation as shown in the equation (2) below to the input signals of R, G, and B, and R', G' and B' are output signals. The matrix arithmetic unit 10 performs chroma intensifying processing similar to the one described above. The value of each term of the 3×3 matrix will be explained later.

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix} \quad (2)$$

From the input values of R', G' and B', a selective color correction unit 11 calculates 6 hue signals $f_R$, $f_G$, $f_B$, $f_C$, $f_M$, and $f_Y$.

$$f_R = \text{Max}(R' - \text{Max}(G', B'), 0) \quad (3)$$

$$f_G = \text{Max}(G' - \text{Max}(B', R'), 0) \quad (4)$$

$$f_B = \text{Max}(B' - \text{Max}(R', G'), 0) \quad (5)$$

$$f_C = \text{Max}(\text{Min}(G', B') - R', 0) \quad (6)$$

$$f_M = \text{Max}(\text{Min}(B', R') - G', 0) \quad (7)$$

$$f_Y = \text{Max}(\text{Min}(R', G') - B', 0) \quad (8)$$

Here, Max (a, b) takes the value of a or b whichever is greater, and Min (a, b) takes the value of a or b whichever is smaller.

Figure 5:
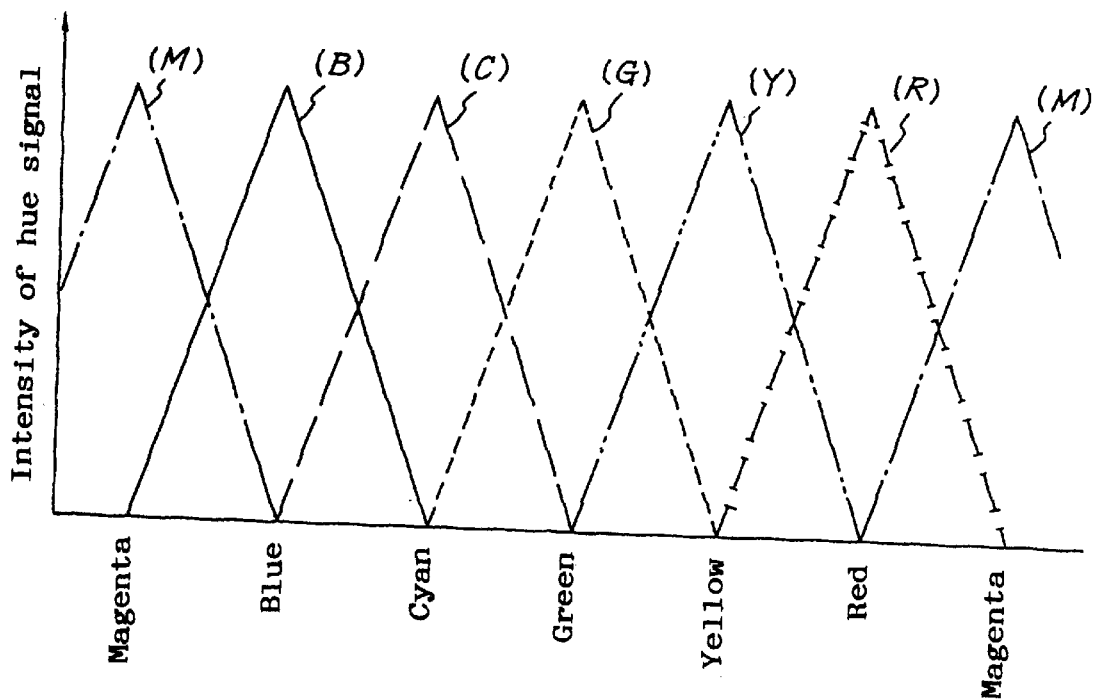
FIG. 5 is a graphic representation of a hue signal calculated by a selective color correction unit 11 shown in FIG. 4.

The calculation of the equations (3) to (8) is to judge which hue the input R', G' or B' has, and it is as shown in graphic representation of FIG. 5. As it is evident from FIG. 5, it is two hue signals at the most among the six hue signals which are not turned to 0 in the calculation.

Next, using these six hue signals and input signals of R', G' and B', the calculation of (9) to (11) is performed to obtain R", G" and B".

$$R'' = R' + A_{R/R} \cdot f_R + A_{R/G} \cdot f_G + A_{R/B} \cdot f_B + A_{R/C} \cdot f_C + A_{R/M} \cdot f_M + A_{R/Y} \cdot f_Y \quad (9)$$

$$G'' = G' + A_{G/R} \cdot f_R + A_{G/G} \cdot f_G + A_{G/B} \cdot f_B + A_{G/C} \cdot f_C + A_{G/M} \cdot f_M + A_{G/Y} \cdot f_Y \quad (10)$$

$$B'' = B' + A_{B/R} \cdot f_R + A_{B/G} \cdot f_G + A_{B/B} \cdot f_B + A_{B/C} \cdot f_C + A_{B/M} \cdot f_M + A_{B/Y} \cdot f_Y \quad (11)$$

where $A_{R/R}$ to $A_{B/Y}$ are correction factors to each of the hue signals and these are constants already determined. The values of these correction factors will be explained later.

Figure 6:
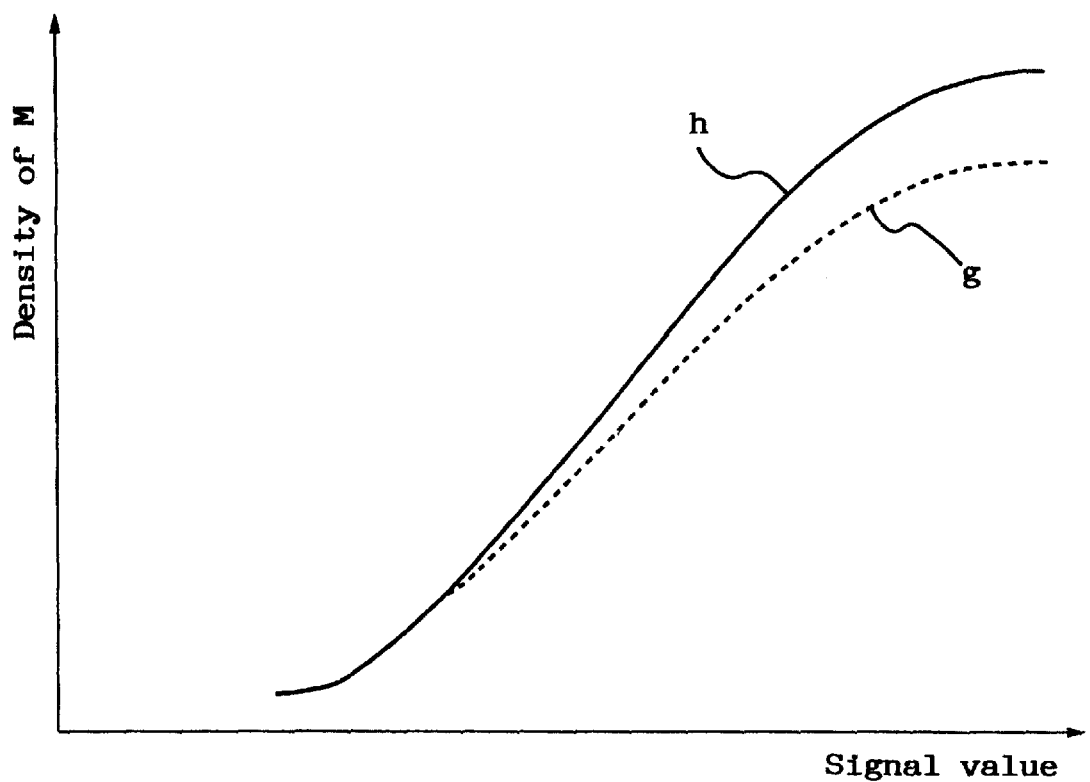
FIG. 6 is a diagram to show the characteristics in case the selective color correction processing previously proposed by the present applicant is performed to input signals of Y, M and C.
Figure 7:
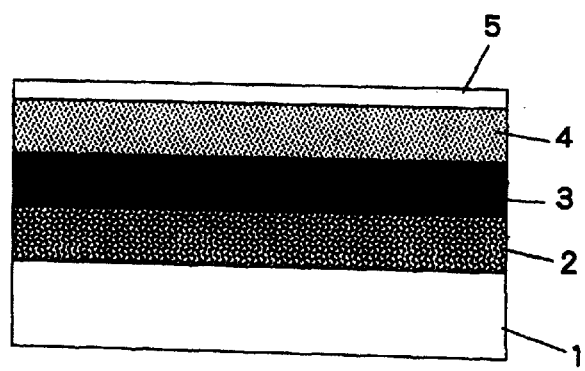
FIG. 7 shows a structure of a direct heat-sensitive color recording medium previously proposed by the present applicant.
Figure 8A:
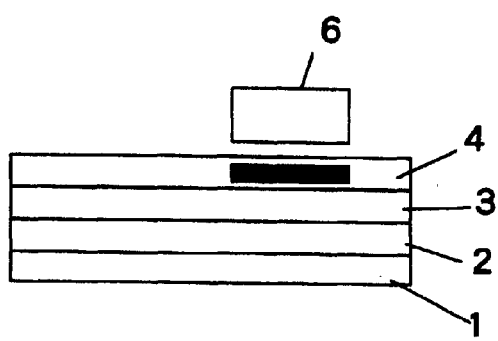
FIG. 8(a), FIG. 8(b), FIG. 8(c), FIG. 8(d) and FIG. 8(e) are to explain a method to form a color image on the direct heat-sensitive color recording medium of FIG. 7.
Figure 8B:
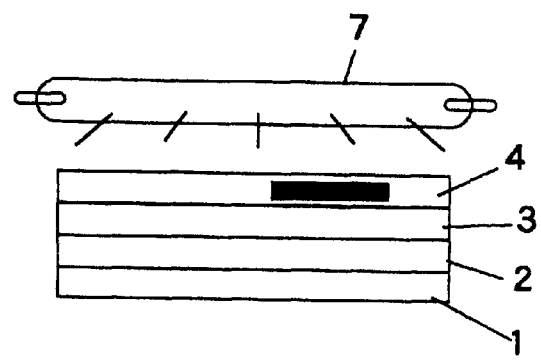
Figure 8C:
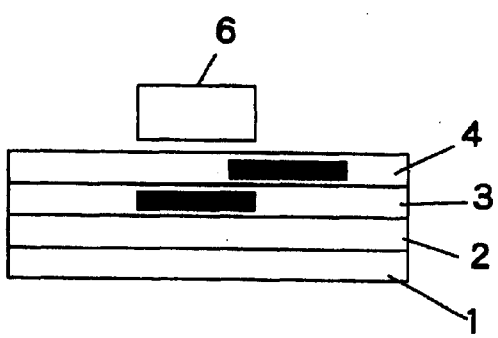
Figure 8D:
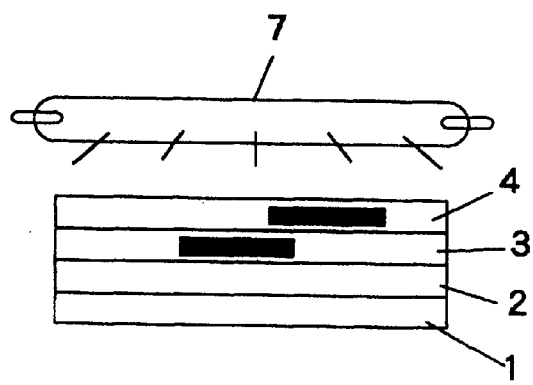
Figure 8E:
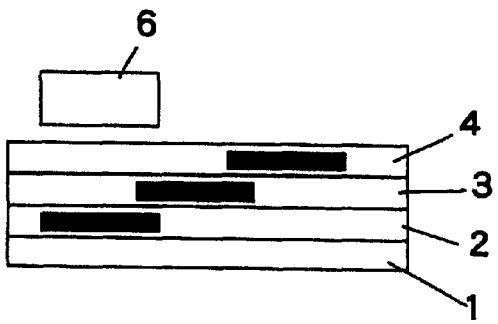

As described above, hue signals are obtained by the equations (3) to (8), and corrected output signals are obtained by the equations (9) to (11) from the hue signals and the input signals. This selective color correction processing is disclosed in JP-A-57-62125, which was filed by the present applicant. When this selective color correction processing is performed to input signals of Y, M and C, for example, the characteristics shown by g in FIG. 6 is obtained. FIG. 6 is a diagram to show the "signal value to density" characteristics of M. In this figure, the characteristics shown by g represents the characteristics of M when an image in M component only is formed and when an image of M component is formed during the formation of an image in red color. The characteristics shown by h represents the characteristics of M when an image of M component is formed during the formation of an image in gray color. Specifically, according to the selective color correction processing, when the image in gray color is formed, the characteristics of M is turned to the characteristics shown by h in FIG. 6. When the image of M only and the image in red color are formed, the density of M has lower contrast compared with the case where the image in gray color is formed as shown by g in FIG. 6, and it is formed in lower density. According to this method, M in high density region is not used when the image in M color only and the image in red color are formed, and it is possible to avoid color mixing as described above.

Output values of the selective color correction unit 11, i.e. R", G" and B", are supplied to a color conversion unit 12 in FIG. 6, and these are converted to Y, M and C respectively and are supplied further to the thermal head. The color conversion unit 12 may comprise an arrangement already known, e.g. 3×3 color conversion matrix may be used.

Figure 4:
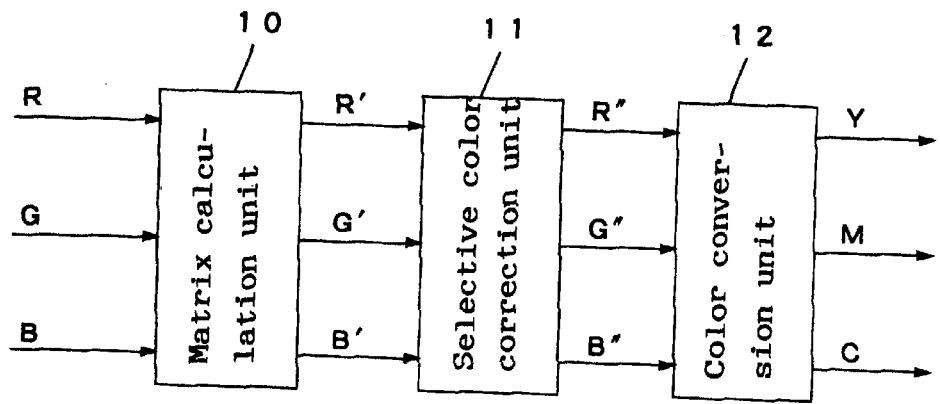
FIG. 4 represents a configuration example of an apparatus for color correction according to the present invention.

Specifically, in the color correction apparatus shown in FIG. 4, the characteristics to intensify chroma obtained through matrix calculation at the matrix calculation unit 10 and the characteristics to avoid color mixing as obtained at the selective color correction unit 11 are synthesized, and output signals of R", G" and B" of the selective color correction unit 11 are converted to Y, M and C respectively to be supplied to the thermal head at the color conversion unit 12. When an image of M component only is formed and when an image of M component is formed during the formation of an image in red color, the characteristics shown by c in FIG. 1 is obtained for M. When an image in Y component only is formed and when an image of Y component is formed during the formation of an image in green color, the characteristics shown by e in FIG. 2 is obtained for Y. For the cases other than the above, the characteristics to intensify chroma as shown by a in FIG. 10 is obtained.

For this purpose, values of each term of 3×3 matrix in the equation (2) at the matrix calculation unit 10 and values of correction factors of $A_{R/R}$ to $A_{B/Y}$ in the equations (9) to (11) at the selective color correction unit 11 are not the values as desired, but these values are restricted. As the result of various experiments, the present inventor decided as follows: each term of the matrix of the equation (2) may be determined as the value within the range of −0.4 to +0.4 for non-diagonal element other than $a_{11}$, $a_{22}$ and $a_{33}$, and the value may be determined to satisfy the equations (12) to (14) for diagonal elements of $a_{11}$, $a_{22}$ and $a_{33}$.

$$a_{11} + a_{12} + a_{13} = 1 \quad (12)$$

$$a_{21} + a_{22} + a_{23} = 1 \quad (13)$$

$$a_{31} + a_{32} + a_{33} = 1 \quad (14)$$

Also, for the values of correction factors in the equations (9) to (11) of the selective color correction unit 11, it is determined as:

$$A_{R/R} = A_{R/M} = A_{R/Y} = A_{G/G} = A_{G/C} = A_{G/Y} = A_{B/R} = A_{B/B} = A_{B/C} = A_{B/M} = 0$$

For the other values, i.e.

$$A_{R/G}, A_{R/B}, A_{R/C}, A_{G/R}, A_{G/B}, A_{G/M}, A_{B/G} \text{ and } A_{B/Y}$$

the values should be determined within the range of 0.0 to 0.3. When matrix calculation and selective color correction processing are performed to the input values of R, G and B using the above values and these are converted to Y, M and C at the color conversion unit 12 in FIG. 4, the characteristics shown by c in FIG. 1 is obtained when an image in M color is formed and when an image in M component is formed during the formation of the image in red color. The characteristics shown by e in FIG. 2 is obtained when an image in Y color is formed and when an image in Y component is formed during the formation of an image in green color. For all other cases, the characteristics with intensified chroma as shown by a in FIG. 10 is obtained.

When the values of R, G and B are in the range of 0 to 255, the values may exceed the range of 0 to 255 in the matrix calculation at the matrix calculation unit 10. In this case, the output signal values may be clipped within the range of 0 to 255 depending upon ability of the arithmetic unit or the values may not be clipped.

According to the apparatus for color correction as described above, color mixing does not occur even in case color image is formed on a direct heat-sensitive color recording medium where a cyan heat-sensitive color developing layer, a magenta heat-sensitive color developing layer and a yellow heat-sensitive color developing layer are sequentially deposited on each other, and an image with high chroma can be obtained. The characteristics to exclude color mixing can be obtained through simple calculation such as 3×3 matrix calculation and the selective color correction processing. This makes it possible to provide the processing at low cost with simple circuit, and the processing can be performed within short time, and no enormous memory capacity as in 3-dimensional LUT is required.

In the above, description has been given on an embodiment of the present invention, while it is needless to say that the present invention is not limited to the above embodiment, and various changes and modifications can be made without departing from the spirit and the scope of the present invention. For example, in the above description, the values of R, G and B are input, and matrix calculation and selective color correction processing are performed for chroma intensifying to R, G and B, and these are then converted to Y, M and C and are supplied to the thermal head, while it is also possible to convert the values of R, G and B to Y, M and C in advance, and 3×3 matrix calculation for chroma intensifying and the selective color correction processing can be carried out to the values of Y, M and C. In this case, however, the values of each term of 3×3 matrix for chroma intensifying and correction factors in the equations (9) to (11) must be selected in such manner that the above characteristics can be obtained.

What we claim is:

1. A method for color correction, characterized in that, in forming a color image on a predetermined recording medium, when an image of a predetermined color component in an image in a predetermined color is formed, higher contrast is obtained compared with a case of formation of an image in gray color until signal value of the color component reaches a certain value, and density of said color is made lower than the density during the formation of the image in gray color when the signal value exceeds said value.

2. A method for color correction, characterized in that, in forming a color image on a direct heat-sensitive color recording medium where a cyan heat-sensitive color developing layer, a magenta heat-sensitive color developing layer, and a yellow heat-sensitive color developing layer are sequentially deposited on each other, when an image of a predetermined color component in an image of a predetermined color is formed, higher contrast is obtained compared with a case of formation of an image in gray color until signal value of the color component reaches a certain value, and density of said color is made lower than the density during the formation of the image in gray color when the signal value exceeds said value.

3. A method for color correction according to claim 2, wherein said image of the predetermined color component in the image of said predetermined color is a magenta component image in an image in magenta color, a magenta component image in an image in red color, a yellow component image in an image of yellow color, and a yellow component image in an image of green color.

4. A method for color correction according to claim 3, wherein characteristics to intensify chroma is obtained in the cases other than the above cases.

* * * * *